Jan. 4, 1966

R. HONEGGER ETAL 3,227,187

MECHANISM FOR CHANGING THE DROP BOX ON A LOOM

Filed May 28, 1962

INVENTOR
Rolf Honegger,
Hans Zollinger
BY Watson Cole Grindle + Watson
ATTORNEYS Inventors
Rolf Honegger
Hans Zollinger
By
Watson Cole Grindle & Watson
Attys.

Jan. 4, 1966

R. HONEGGER ETAL 3,227,187

MECHANISM FOR CHANGING THE DROP BOX ON A LOOM

Filed May 28, 1962

Inventors
Rolf Honegger
Hans Zollinger
By
Watson, Cole, Grindle & Watson
Attys

Inventors
Rolf Honegger
Hans Zollinger
By
Watson Cole Grindle & Watson
Attys.

Jan. 4, 1966   R. HONEGGER ETAL   3,227,187
MECHANISM FOR CHANGING THE DROP BOX ON A LOOM
Filed May 28, 1962                           6 Sheets-Sheet 6

Inventors
Rolf Honegger
Hans Zollinger
By Watson, Cole, Grindle & Watson Attys.

United States Patent Office 3,227,187
Patented Jan. 4, 1966

3,227,187
MECHANISM FOR CHANGING THE DROP
BOX ON A LOOM
Rolf Honegger, Kirchberg, Duernten, Zurich, and Hans Zollinger, Ruti, Zurich, Switzerland, assignors to Maschinenfabrik Rüti A.G., Ruti, Zurich, Switzerland, a company of Switzerland
Filed May 28, 1962, Ser. No. 197,985
Claims priority, application Switzerland, June 1, 1961, 6,437/61
4 Claims. (Cl. 139—171)

The invention relates to a mechanism for changing a drop box on a loom.

More particularly this invention relates to a mechanism on a loom, with special reference to a multi-color automatic loom, in which there is, in conjunction with the changing mechanism for moving the drop box with its plurality of weaving shuttles arranged in compartments next to each other, an apparatus for delaying the drop box position indications imparted by the shedding motion information carrier in the form of a pattern card or the like, which indications are intended for the control of the drop box changing mechanism. By delaying the drop box position indications there is to be understood, the feature that the indications are delivered to a means by which they are stored so as to be available for further use for a predetermined period of time.

In Jacquard machines, pick and pick looms and the like, the indication for the shed formation is needed earlier than the information for the changing mechanism for the shifting of the drop box. Both are, however, sensed simultaneously. Because of this fact, it is an object of the present invention to provide for the storing of the shed formation indication.

In order to render the loom applicable for weaving fabrics of different kinds, it must be possible to shift the shed forming operation in time with regard to the overall cycle of operation of the loom.

It is another object of the present invention to produce a mechanism by which such shifting can be made over a comparatively wide range. Accordingly, in the case of such a mechanism in which, in conjunction with the changing mechanism for the shifting of the drop box, a device for delaying the impulses imparted by the pattern card is provided, whereby the drop box receives the change movement by means of the changing mechanism, the invention consisting essentially therein that for the purpose of delaying the control information, the transmitting elements which transmit the control information from the shedding motion control information carrier to the changing mechanism are connected with the stops which are brought in and out of engagement with the units of the changing mechanism which are continuously driven by the driving shaft of the loom. Thus, as a result of this engagement, a shifting of the drop box results so that the delaying of the control information is controlled or governed by a given distance by which the transmitting elements move.

Further objects of the invention will be apparent from the following description when considered in connection with the accompanying drawings which, purely by way of an example, illustrate a preferred embodiment of the device according to the invention and in which.

Figure 1:
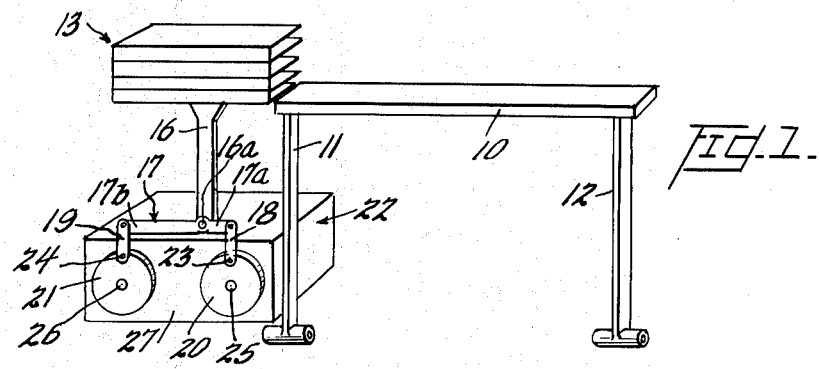
FIGS. 1 to 4 are perspective diagrammatic views of the drop box changing mechanism, the sley, and the drop box, showing four different positions.

According to the embodiment of FIGS. 1 to 4, there is, in addition to the loom sley 10 which is fixed upon the two sley supports 11 and 12, a drop box 13 having four compartments for the reception of four shuttles which have bobbins of different types of colors of yarn.

The drop box 13 is connected by means of a connecting rod 16, to a balance lever 17, two crank arms 18 and 19, two crank pins 23 and 24 and two crank discs 20 and 21 with shafts 25 and 26 respectively, said shafts being supported in a housing 22 of the changing mechanism. The balance lever 17 is divided in two arms 17a and 17b of differing lengths, FIGS. 1 to 5, relative to the pivot point 16a of the connecting rod 16 so that the length of the shorter arm 17a equals one-third the total length of the balance lever 17. The crank discs 20 and 21 are maintained in their assigned working positions by means of spring stop levers 69 and 70, FIG. 5.

Figure 5:
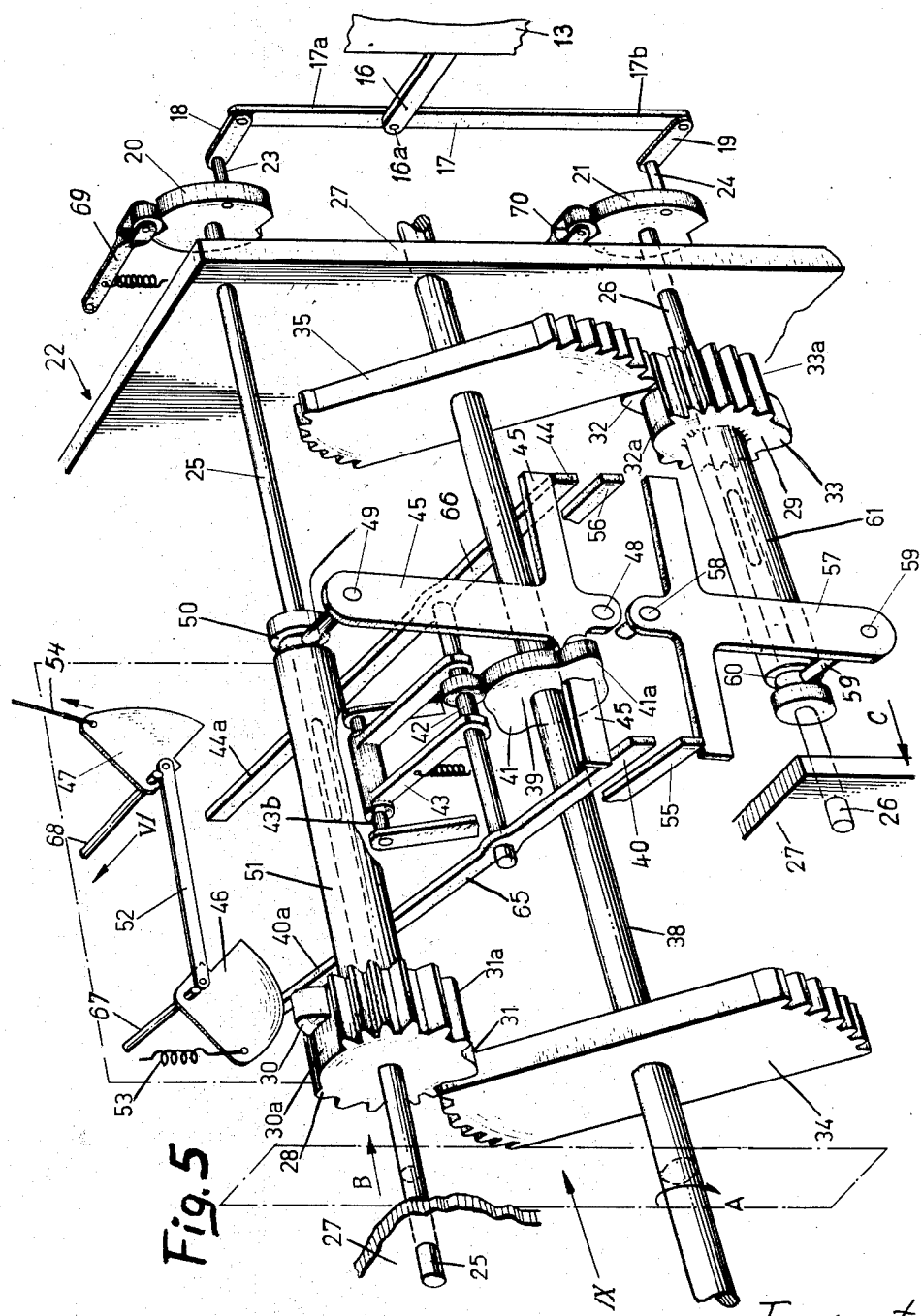
FIG. 5 is a perspective view of the drop box changing mechanism, showing the individual parts of the specific embodiment.

Should the crank pins 23 and 24, of the crank discs 20 and 21 be in their uppermost positions, as in FIGS. 1 and 5, then the lowermost compartment of the drop box 13 is in the working position in the front of the loom sley 10, that is the working position.

Figure 2:
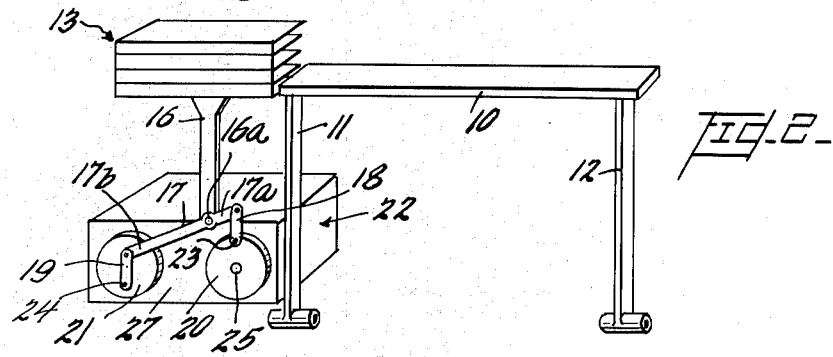
Figure 3:
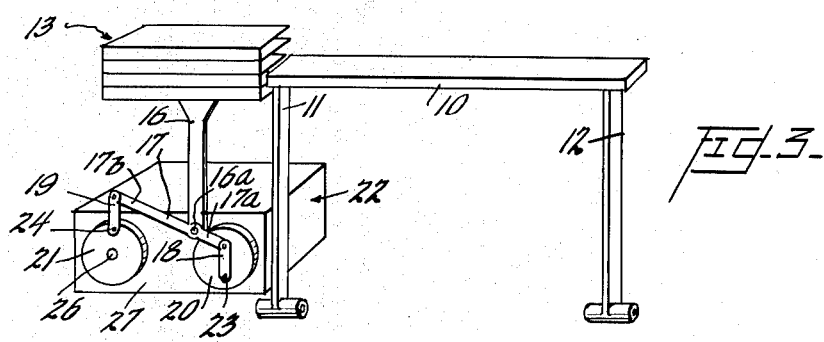
Figure 4:
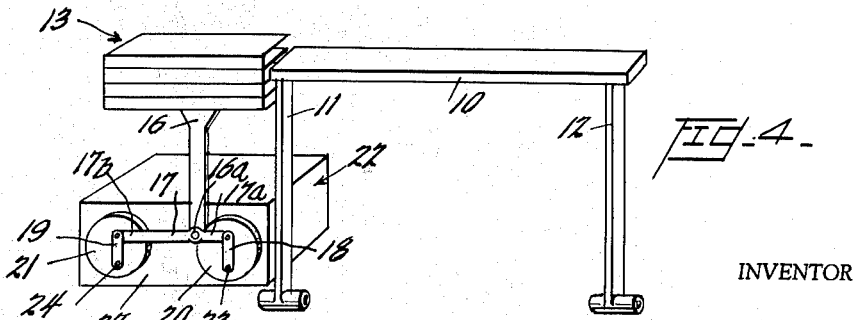

From FIGS. 2, 3 and 4 it can be seen as to the manner in which, according to the positions taken up at the time by the crank discs 20 and 21, a different compartment may be placed in the working position. According to FIG. 2, the crank pin 23 is up and the crank pin 24 is down and the compartment next to the lowermost is thereby brought into the working position. As shown in FIG. 3, the crank pin 23 has taken the lower position and the crank pin 24 the upper position, whereby the following (one up) compartment is brought into the working position. Finally, in FIG. 4, both crank pins 23 and 24 are shown down or at the bottom, so that the top compartment is now in working position.

In each instance, the movement of the drop box 13 emanates from a changing mechanism which is illustrated in FIG. 5. As can be seen from this FIG. 5, the two crank discs 20 and 21 are fixed one on each of the shafts 25 and 26 respectively, which shafts are fixed into the walls 27 of the housing or changing mechanism 22 of the changing mechanism. On the shaft 25 there is a sliding toothed wheel 28 together with an attached hollow shaft or sleeve 51, and on the shaft 26 there is provided a sliding toothed wheel 29 with an attached hollow shaft or sleeve 61, which can be shifted in an axial direction but can only be rotated together with the shaft. Each of the sliding toothed wheels 28 and 29 operate together with a double toothed segment 34 and 35 respectively, which are fixed on a driving shaft 38. The driving shaft 38 is connected, for the purpose of being driven, with the driving shaft (not shown) of the loom and rotates continuously while the loom is in operation. From the driving shaft 38 there results the operation of the two crank discs 20 and 21 and thereby the movement or adjustment of the drop box 13. Each of the sliding toothed wheels 28 and 29 is provided with two lobes 30, 31 and 32, 33 respectively, and these are of a width equal to half the width of the wheel and are located 180° from each other at different levels. The lobes 30 and 31 in the one instance, and 32 and 33 in the other instance, are each arranged around the shaft, separated from one another and each sliding toothed wheel 28 and 29 is so designed that upon the engagement of one of the double toothed segments 34 and 35 respectively, with the associated sliding toothed wheel 28 or 29 respectively, always only one such lobe can work in conjunction therewith. On one side of the lobes 30, 31 and 32, 33 respectively, there are gaps or smooth sections 30a and 31a, and 32a and 33a respectively, with no teeth thereon on the circumference of the sliding toothed wheels 28 and 29 and these are therefore also set at 180° from each other and so designed that the driving shaft 38 with the double toothed segments 34, 35 can make a complete revolution without these latter engaging with the sliding toothed wheels 28, 29. Each of the sliding toothed wheels 28 and 29 respectively, remains therefore only during a turn of 180° in engagement with the respective double toothed segment 34 or 35. In order to turn the sliding toothed wheels 28, 29 respectively, again through 180° a shifting on the respective shaft 25 or 26 must first take place.

Figure 9:
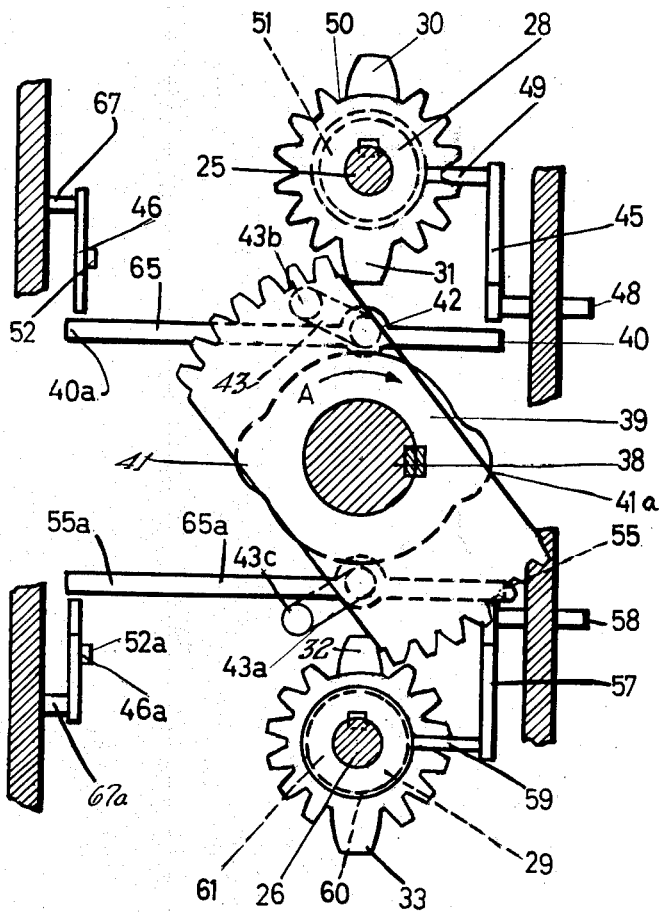
FIG. 9 is an end elevation partly in cross section of a part of the mechanism of FIG. 5.

On the driving shaft 38 there is fixed a cam disc 39 having two lobes 41 and 41a, and these lobes work together with two swing forks 43 and 43a, FIG. 9, of which in FIG. 5 only the swing fork 43 is shown. The swing forks 43 and 43a lie with their pivot pins 42 and 42a, respectively, by means of rollers, against the cam discs 39, and the pivot pin 42 is set to swivel in a pair of two-armed swing levers 65 and 66.

Correspondingly, the pivot pin 42a is set to swivel in a pair of two-armed swing levers of which only the swing lever 65a, is shown in FIG. 9. Each of the swing forks 43 and 43a is set to swivel upon a fixed axle 43b and 43c respectively. The arms 40 and 44 of the pair of swing levers 65 and 66 work together with a cross lever 45, which swivels upon a pin 48 fixed in the frame and which engages by means of a pin 49 in a groove 50, the hollow shaft 51 of which is attached to the sliding toothed wheel 28. The arms 55 and 56 of the lower pair of swing levers which are only partially shown in FIG. 5, work in conjunction with a cross lever 57, which is pivotally fixed on a fixed pin 58 and which engages by means of a pin 59 in a groove 60, the hollow shaft 61, of which is attached to the sliding toothed wheel 29, in order to shift it in the direction of the shaft 26.

Because, in the case of Jacquard machines and the like, and as already mentioned, the control information from the pattern cards must take effect earlier for the shedding motion than for the movement of the drop box and to increase the operation of the loom for different yearns, a device for delaying the control impulses is provided, as will be described in the following.

The arms 40a and 44a, which form the opposite ends of the pair of swing levers 65 and 66, respectively, to the arms 40 and 44, operate in conjunction with the two stops 46 and 47, which are in the form of checking segments and which are pivotable on the axles 67 and 68, respectively. The corresponding arrangement which is on the other side of the driving shaft 38, is only partially shown by means of the end elevation view of FIG. 9. There is shown the checking segment 46a carried pivotably on the axle 67a. The pair of segments 46, 47 is connected by rod 52, and the corresponding segments on the other side of shaft 38 are connected by means of a rod 52a. The tension spring 53 (FIG. 6) which, on the one hand, engages with the stop 46 and on the other hand is suspended from a fixture on the housing, and tends to swivel the stops or delaying means 46, 47 clockwise on the bearing pins 67, 68. A means of transmission 54, as for example a cable, leads from the stop 47 to the shedding motion control information carrier of a Jacquard machine or the like, which information carrier may be, for example, a pattern card. The stops 46, 47 are in the form, in their present embodiment, of circular sectors, being pivotable about their bearing pins 67, 68 respectively.

The operation of the stops 46, 47 will now be more clearly described with reference to FIGS. 6, 7 and 8.

The information from a pattern card is transmitted by means of the cable 54 to the two sectors or stops 46, 47. A hole in the pattern card causes the cable 54 to be pulled so that the stops 46, 47 take the position shown in FIG. 6. When the information indicating a hole is annulled, the stops 46, 47 take the position shown in FIG. 7. While the stops 46, 47 are moved from the position of FIG. 6 to that of FIG. 7, the movement of the arm 40a is restricted by the stop 46 while the latter is moved along the distance a. These segment-shaped stops 46, 47 therefore retard the annulment of the information from the pattern card, that is to say they retard the release of the arm 40a while the releasing of the cable 54 has already taken place. Should there be no hole in the pattern card then the stops 46, 47 take a position as shown in FIG. 8. When the information indicating "no hole" is annulled the stops 46, 47 move to the position shown in FIG. 7. During this movement along the distance b the movement of the arm 44a is restricted, that is to say that also in this case the release of the arm 44 is retarded, even though cable 54 is being pulled. The device according to the invention with the segment-shaped stops 46, 47 aims at retarding the release of the arms 40a, 44a after the pattern card impulse has been annulled.

The changing of the drop box 13, FIGS. 1 and 5, is carried out in the following manner:

By a revolution of the driving shaft 38 in the direction of arrow A, FIG. 5, the lobe 41, the cam disc 39, the pin 42 and the swing fork 43 are swivelled about the fixed axle 43b, whereby the arm 40a of the swing lever 65 comes into contact with the stop 46 while the other arm 40 of the swing lever 65 swivels the cross lever 45 clockwise. The arm 44a of the other swing lever 66 is out of contact with the stop 47 and therefore receives no support for operating the cross lever 45. By the swivelling of the cross lever 45 clockwise about the pin 48, the hollow shaft 51, and therewith the sliding toothed wheel 28, is shifted in the direction of the arrow B, FIG. 5, this taking place due to the pin 49 which is guided in the groove 50. Therefore, the result of this shifting of the sliding toothed wheel 28 is that the cam 31 is brought within action radius of the double toothed segment 34. The double toothed segment 34 strikes, in the course of its rotation, against the lobe 31 and rotates the sliding toothed wheel 28 far enough until the teeth of the sliding toothed wheel 28 engage with the double toothed segment 34, resulting in the sliding toothed wheel 28 being turned through 180°.

When the information on the punched card requires that the crank arm 18 remains in the position into which it was moved by the just described operation, the two stops 46 and 47 will again be in the same position when the cam disc 39 causes the next lifting movement of the pivot pin 42. This means that the cross lever 45 will not be rotated and thus, the shaft 51 the toothed wheel 28 will not be shifted  The toothed segment 34 will therefore pass the smooth section 30a (which is now in its lower position) and the shaft 25 will not be turned.

Figure 8:
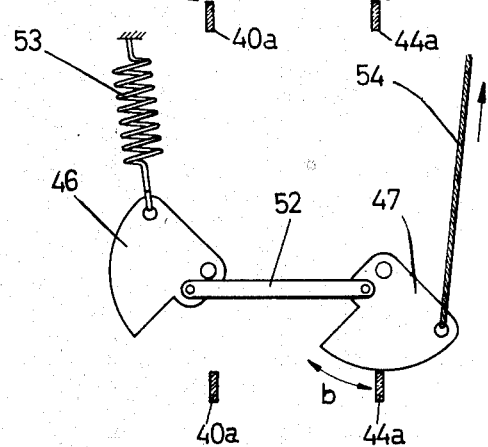

When, however, the information on the punched card calls again for a rotation of the crank arm 18, the two stops 46, 47 will not be moved in the position shown in FIG. 5, but will remain positioned as shown in FIG. 8. Under these conditions when the pin 42 is lifted by one of the lobes 41 or 41a on the cam disc 39, the end 40a of the swing lever 65 can move freely, however, the end 44a of the swing lever 66 is prevented from moving up by the stop 47. Therefore, the cross lever 45 will rotate in the counter-clockwise direction about its pivot point 48, thereby shifting the shaft 51 together with its toothed wheel 28 to the left. This brings the lobe 30 (which is under these conditions in its lower position) into engagement with the toothed segment 34 during rotation of the latter. The teeth of the segment 34 cause a rotation of the toothed wheel 28 by 180°, thus rotating the crank arm 18 by 180°.

The operation of the device which is arranged below the driving shaft 38, which serves to operate the crank arm 19 and which is partially shown in FIG. 9 operates in a mirror-like fashion and will therefore not be described in detail.

Figure 10:
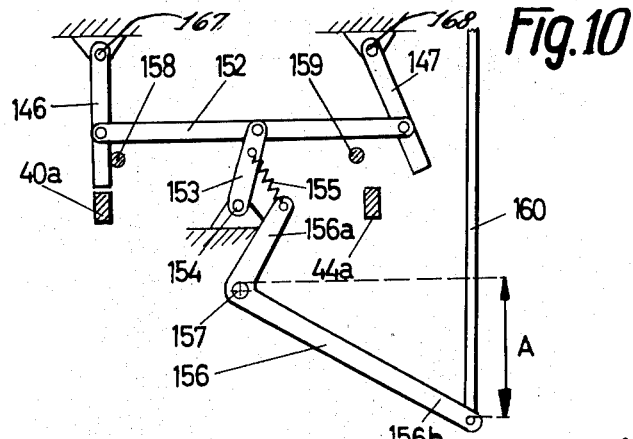
FIGS. 10 to 12 are side elevations of modified stop members in different positions.
Figure 11:
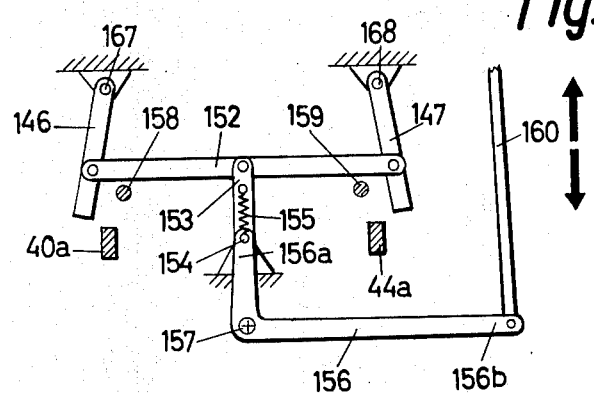
Figure 12:
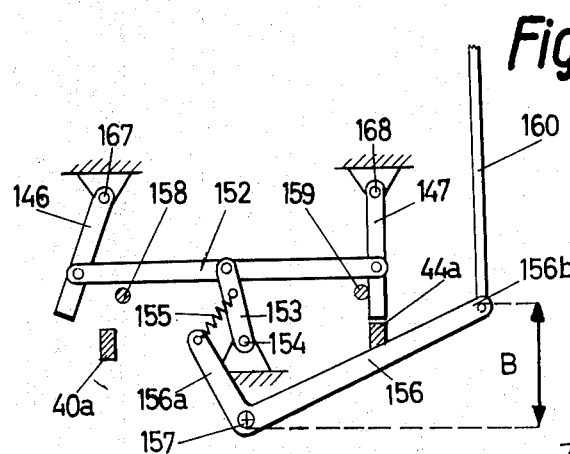

According to the second variation of the invention, as shown in FIGS. 10–12, two stops 146 and 147 operate in conjunction with the arms 40a and 44a respectively, which form the ends of a pair of swing levers. These stops 146 and 147, as well as those stops lying on the other side of the driving shaft 38 in an arrangement corresponding to the arrangement shown in FIG. 9, are carried pivotably upon fixed pins 167 and 168, respectively, and are connected with one another by means of a rod 152. In the middle of the rod 152 there is pivoted a lever 153 which at its lower end is pivotally secured upon a pin 154. The lever 153 is connected by means of a spring 155 with one arm 156a of an angle lever 156 which is pivotably mounted on the pin 157. The other arm 156b of the angle lever 156 is connected by means of a transmitting element, such as a cable 160 of its equivalent, with a pattern card controlled sensing arrangement of a Jacquard machine or the like.

The swivelling range of the two stops 146 and 147 is limited by the two fixed pins 158 and 159, respectively.

Figure 13:
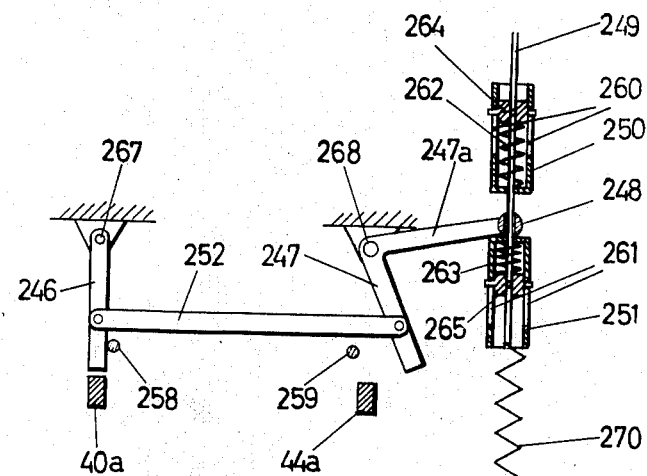
FIGS. 13 to 15 are side elevations partly in section of a second modified stop member in different positions.
Figure 14:
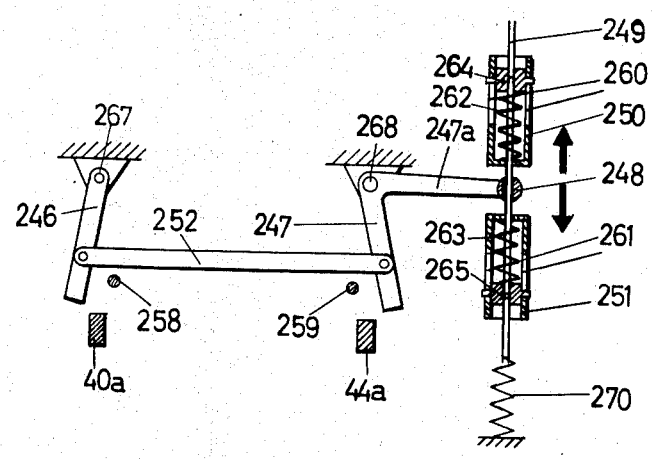
Figure 15:
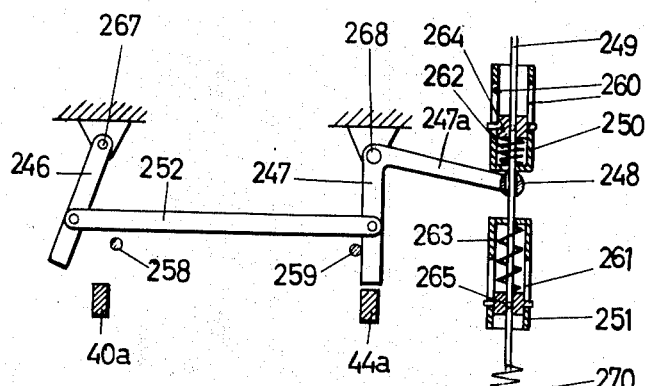

According to the third modification of the invention shown in FIGS. 13 to 15, two stops 246 and 247 operate in conjunction with the arms 40a and 44a, respectively, which form the ends of a pair of swing levers 65 and 66, as shown in FIG. 5. These stops 246 and 247 are pivotally mounted on pins 267 and 268 respectively and are interconnected with one another by means of a rod 252. The swivelling range of the two stops 246 and 247 is limited by the fixed pins 258 and 259 respectively. The stop 247 has an arm 247a at one end thereof in which a hole 248 is bored for guiding a transmitting element such as a cable 249 or its equivalent. On the cable 249 there is attached a spring 270 which tends to force the stop 247 against the pin 259. The strength of this spring 270 must exceed that of the combined two hereunder described springs 262 and 263. The cable 249 is connected with a pattern card controlled information transmitter of a Jacquard machine or the like and this cable passes axially through two cylinders 250 and 251. The cylinders 250 and 251 are each provided with two slots 260 and 261 respectively, and there are provided springs 262 and 263 which tend to force two pistons 264 and 265 guided in the slots 260 and 261 respectively against the end of these slots. The cable 249 is attached to these two pistons 264 and 265. The two cylinders 250 and 251 operate in conjunction with the arm 247a of the stop 247.

Figure 6:
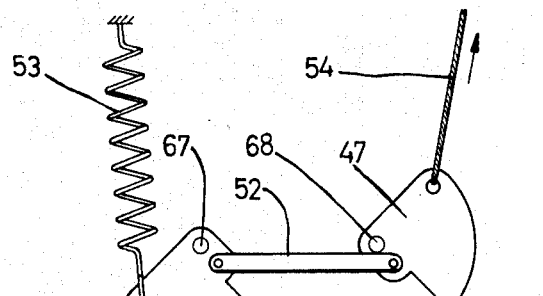
FIGS. 6, 7 and 8 are side elevations of a pair of stops in different positions.
Figure 7:
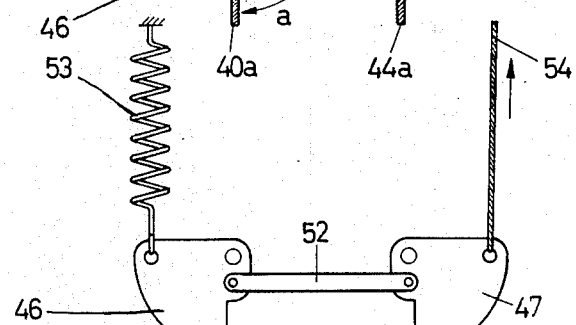

The operation of the above-described mechanism is as follows:

Referring first to FIGS. 6 to 8, it is presumed that at the laying in of the next pick, the top compartment for the shuttles is to be brought into working position in place of the lowermost compartment. As, according to FIGS. 1 and 5, the two crank pins 23 and 24 would be in the upper position, both of these pins must, in order to bring the top compartment into the working poistion, be moved through 180°, FIG. 4.

By means of the information transmitter, which is controlled by a pattern card, as, for instance, on a Jacquard machine in the example shown in FIGS. 6 to 8, the cable 54 is pulled so that the two stops 46 and 47 reach the position shown in FIG. 6 against the pull of the draw spring 53. The stop 46 thereby comes to lie immediately about the arm 40a of the swing lever 65, while the stop 47 is swung out of reach of the arm 44a of the swing lever 66. As mentioned, these control movements originate in the pattern card before the drop box is changed. The delaying of the control impulse is achieved as a result of the fact that a stop must be moved approximately through the extent of the arc a, FIG. 6, or b, FIG. 8, before the second stop moves away and the first supports its accompanying swing lever.

Should the two stops 46 and 47 be in the position shown in FIG. 8 prior to the changing of the drop box 13, then the time lag between the sending out of the control movement impulse from the pattern card and the changing of the drop box 13 to a new working position results from the fact that with the pulling of the cable 54, the stop 47 must first be swung through an arc approximating to the extent of b FIG. 8, before the arm 40a of the swing lever 65 comes to be supported against the corresponding stop 46 and thereby the other arm 40 of the same swing lever causes the cross lever 45 assigned to it to operate.

Owing to the coupling of the pairs of stops 46, 47 respectively, by the rod 52, these stops cannot simultaneously engage with the arms 40a, 44a, respectively, as will be seen from FIG. 7, whereby, however, the time interval during which neither of the arms 40a, 44a is held in check can be kept very short.

The mode of operation of the second modification of the invention is as follows:

For example, as shown in FIG. 10, if the arm 40a is held in check by means of the stop 147, as shown in FIG. 12, then it suffices, by means of the cable 160, to swivel the angle lever 156 so far that the arm 156a of the angle lever 156 passes the dead center position shown in FIG. 11. Thereby, the lever 153 is swivelled about the pin 154 by means of the spring 155 and this shifts the rod 152, as shown in FIG. 12, so far to the left that the stop 147 strikes against the fixed pin 159 and holds the arm 44a in check.

The delaying of the control impulse is achieved in this instance through the condition that the angle lever 156 has to travel through a predetermined path A before the lever 153 moves from the position shown in FIG. 10 into the position according to FIG. 12.

Should the lever 156 be in the position shown in FIG. 12 it must then travel along the predetermined path B (equal in length to the path A), in order that the lever 153 should move out of the position shown in FIG. 12 and into the position according to FIG. 10.

The respective path A or B which the lever 156 must travel equals, in the first variation of the invention, the length of the edges of the stops 46, 47 which are indicated in FIGS. 6 and 8 respectively, also marked with the letters a and b respectively.

The mode of operation of the third modification of the invention, according to FIGS. 13 to 15, is as follows:

If, for example, as shown in FIG. 13, the arm 40a is held in check by the stop 246 and should, as in FIG. 15, the arm 44a be held in check by the stop 247, the cable 249 together with the attached pistons 264, 265 is moved so far down that the piston 264 can, by means of the spring 262 and the cylinder 250, swivel the arm 247a of the stop 247 about the axle 268 to the position shown in FIG. 15. Through this movement of the cable 249 downward, at first, the spring 263 is released and, finally, at the end of the movement, the spring 262 compressed.

This movement of the cable 249, which is controlled from the impulse sender of the Jacquard machine, takes place through the action of the spring 270.

Should, on the other hand, through the impulse sender of the Jacquard machine, the cable 249 be pulled, then the stop 248 would be swung back into the position according to FIG. 13, opposing the action of the spring 270, thereby the spring 262 would be released and the spring 263 compressed.

It is because of this path which the cable 249 with the piston 264, 265 must travel, in order, on the one hand, to release the spring 262 and, on the other hand, to compress the spring 263, that the delaying of the control impulse given out by the impulse sender of the Jacquard machine results.

This path equals the length of the slots 260 and 261 in the cylinders 250 and 251 respectively, and can be freely predetermined.

We claim:

1. In a multi-color automatic loom, a changing mechanism for moving a drop box with a plurality of shuttle compartments arranged next to each other to change the position of said drop box in accordance with a pattern means, said changing mechanism comprising control means, means for delaying the delivery of the drop box position indications imparted by the pattern means to said control means, said control means comprising swing levers and said delaying means comprising swing lever stops to be brought into and out of the path of said swing levers thereby controlling the position of said drop box, transmitting means to transmit movement of said pattern means to said swing lever stops, said transmitting means and said lever stops moving through a predetermined distance with said swing lever stops remaining in or out of the swing path of the swing levers, the delay of the transmission of said drop box position indications being given by the time necessary for said transmitting means to move through said predetermined distance, a driving shaft, a pin on which the swing levers are mounted, and a cam disc on the driving shaft, said swing levers being arranged to swivel by means of a swing fork pivotable about a fixed axle.

2. In a multi-color automatic loom, a changing mechanism for moving a drop box with a plurality of shuttle compartments arranged next to each other to change the position of said drop box in accordance with a pattern means, said changing mechanism comprising control means, means for delaying the delivery of the drop box position indications imparted by the pattern means to said control means, said control means comprising swing levers and said delaying means comprising swing lever stops to be brought into and out of the path of said swing levers thereby controlling the position of said drop box, transmitting means to transmit movement of said pattern means to said swing lever stops, said transmitting means and said lever stops moving through a predetermined distance with said swing lever stops remaining in or out of the swing path of the swing levers, the delay of the transmission of said drop box position indications being given by the time necessary for said transmitting means to move through said predetermined distance, said swing lever stops being in the form of segments of a circle which are pivoted and are linked with one another to present their impact surfaces to one swing lever of said swing levers so that they take turns in selectively holding in check one of the swing levers.

3. In a multi-color automatic loom, a changing mechanism for moving a drop box with a plurality of shuttle compartments arranged next to each other to change the position of said drop box in accordance with a pattern means, said changing mechanism comprising control means, means for delaying the delivery of the drop box position indications imparted by the pattern means to said control means, said control means comprising swing levers and said delaying means comprising swing lever stops to be brought into and out of the path of said swing levers thereby controlling the position of said drop box, transmitting means to transmit movement of said pattern means to said swing lever stops, said transmitting means and said lever stops moving through a predetermined distance with said swing lever stops remaining in or out of the swing path of the swing levers, the delay of the transmission of said drop box position indications being given by the time necessary for said transmitting means to move through said predetermined distance, said swing lever stops alternate with one another so that they selectively hold in check one swing lever of said pair of swing levers, and a tipping lever system composed of a tipping lever system composed of a tipping lever and an angle lever together with a spring which connects the tipping lever with the angle lever which, in turn, is controlled by said pattern means.

4. In a multi-color automatic loom, a changing mechanism for moving a drop box with a plurality of shuttle compartments arranged next to each other to change the position of said drop box in accordance with a pattern means, said changing mechanism comprising control means, means for delaying the delivery of the drop box position indications imparted by the pattern means to said control means, said control means comprising swing levers and said delaying means comprising swing lever stops to be brought into and out of the path of said swing levers thereby controlling the position of said drop box, transmitting means to transmit movement of said pattern means to said swing lever stops, said transmitting means and said lever stops moving through a predetermined distance with said swing lever stops remaining in or out of the swing path of the swing levers, the delay of the transmission of said drop box position indications being given by the time necessary for said transmitting means to move through said predetermined distance, said stops alternating with one another in turn to hold the corresponding swing lever in check and said stops being controlled by said drop box position indications by means of a cable, and a system of springs consisting of three springs of which two springs are arranged in cylinders and alternate with one another in carrying out the function as pressure springs for the transmission of the control information, the third spring functioning as a draw spring attached to the cable and fixed on the housing of the drop box changing mechanism.

References Cited by the Examiner

UNITED STATES PATENTS

| | | | |
|---|---|---|---|
| 564,374 | 7/1896 | Goodyear | 139—179 |
| 590,383 | 9/1897 | Bardsley | 139—179 |
| 626,960 | 6/1899 | Bardsley | 139—179 |
| 1,554,297 | 9/1925 | Ryon | 139—180 |
| 1,668,146 | 5/1928 | Gordon | 139—179 |
| 1,691,154 | 11/1928 | Holmes | 139—180 |

FOREIGN PATENTS

| | | |
|---|---|---|
| 1,061,037 | 11/1953 | France. |

DONALD W. PARKER, *Primary Examiner.*

RUSSELL C. MADER, *Examiner.*